United States Patent
Sadacharam et al.

(10) Patent No.: US 9,659,163 B2
(45) Date of Patent: *May 23, 2017

(54) SECURE AUTHENTICATION MECHANISM USING QUICK RESPONSE CODES

(71) Applicant: International Business Machines Corporation, Armonk, NY (US)

(72) Inventors: Saravanan Sadacharam, Chennai (IN); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,606

(22) Filed: Feb. 3, 2016

(65) Prior Publication Data
US 2016/0239655 A1    Aug. 18, 2016

Related U.S. Application Data

(63) Continuation of application No. 14/620,606, filed on Feb. 12, 2015, now Pat. No. 9,300,658.

(51) Int. Cl.
*G06K 5/00* (2006.01)
*G06F 21/36* (2013.01)
(Continued)

(52) U.S. Cl.
CPC .............. *G06F 21/36* (2013.01); *G06F 21/42* (2013.01); *H04L 63/08* (2013.01); *H04L 63/18* (2013.01)

(58) Field of Classification Search
CPC ......... G06F 21/36; G06F 21/42; H04L 63/08; H04L 63/083; H04L 63/04; H04L 63/12
(Continued)

(56) References Cited

U.S. PATENT DOCUMENTS 6,572,025 B1 * 6/2003 Nishikado .............. G06K 1/123
                                                       235/462.09
8,510,225 B2    8/2013 Yach et al.
(Continued)

FOREIGN PATENT DOCUMENTS

WO    2009144010 A1    12/2009

OTHER PUBLICATIONS

Blanton, M. et al. "Secure Computation of Biometric Matching", Department of Computer Science and Engineering, University of Notre Dame; Apr. 2009.
(Continued)

*Primary Examiner* — Paultep Savusdiphol
(74) *Attorney, Agent, or Firm* — Brown & Michaels, PC; John R. Pivnichny

(57) ABSTRACT

A method of securing authentication of a user's identity is disclosed. The method comprises the steps of: an authentication program of an entity receiving initiation of a transaction from a user; the authentication program searching for associated information of the user; the authentication program choosing an authentication query requiring input from the user based on the associated information; the authentication program generating a visual code representing the authentication query; the authentication program splitting the visual code into pieces; and the authentication program sending each piece of visual code to the user via a separate communication channel. A method of securing authentication of a user's identity with an entity is also disclosed.

15 Claims, 5 Drawing Sheets

(51) Int. Cl.
*G06F 21/42* (2013.01)
*H04L 29/06* (2006.01)

(58) Field of Classification Search
USPC .................................. 235/375, 380
See application file for complete search history.

(56) References Cited

U.S. PATENT DOCUMENTS

| | | | | |
|---|---|---|---|---|
| 8,527,773 | B1* | 9/2013 | Metzger | G06F 21/31 380/255 |
| 8,595,507 | B2 | 11/2013 | Panchapakesan et al. | |
| 8,654,971 | B2* | 2/2014 | Orsini | H04L 9/085 370/228 |
| 2005/0178833 | A1* | 8/2005 | Kisliakov | G06K 19/07 235/441 |
| 2006/0098241 | A1* | 5/2006 | Cheong | G06K 7/14 358/463 |
| 2008/0072304 | A1 | 3/2008 | Jennings et al. | |
| 2010/0228988 | A1* | 9/2010 | Walker | G06Q 20/3415 713/184 |
| 2013/0019096 | A1 | 1/2013 | Palzer et al. | |
| 2014/0006293 | A1 | 1/2014 | Chang et al. | |
| 2014/0119647 | A1* | 5/2014 | Cheong | G06K 9/18 382/166 |
| 2015/0220921 | A1* | 8/2015 | Dent | G06Q 20/40 705/44 |
| 2015/0302421 | A1* | 10/2015 | Caton | G06Q 30/018 705/17 |
| 2015/0317466 | A1* | 11/2015 | Kumar | G06F 21/32 726/7 |

OTHER PUBLICATIONS

Ramya, K.P. et al. "SIMHA: Secure Biometric Multi-Host Authentication", International Journal of Research in Engineering & Advanced Technology, vol. 1, Issue 5, Oct.-Nov. 2013.

Ivanov, V. et al. "Securing the communication of medical information using local biometric authentication and commmercial wireless links", Health Informatics Journal 16(3), pp. 211-223; 2010.

Barak, B. et al. "Secure Computation Without Authentication", Advances in Cryptology—CRYPTO 2005 Lecture Notes in Computer Science, vol. 3621, pp. 361-377; 2005.

List of related applications. Feb. 2, 2016.

* cited by examiner

SECURE AUTHENTICATION MECHANISM USING QUICK RESPONSE CODES

BACKGROUND

The present invention relates to authentication of user identity, and more specifically to secure authentication of a user's identity through quick response (QR) codes.

Authentication of a user's identity over the Internet has become increasingly challenging in view of online fraud and exploitation of computer security by others. To meet this challenge, U.S. Pat. No. 8,654,971 uses an authentication engine which includes a data splitting module and data assembling module as well as encryption and decryption. Referring to paragraph [0132] " . . . . The data splitting module 520 advantageously comprises a software, hardware, or combination module having the ability to mathematically operate on various data so as to substantially randomize and split the data into portions." This system utilizes encryption and decryption of data which can be intercepted and decrypted.

Other solutions use multiple entities, for example US Publication No. 2013/0019096 discloses a first entity for communicating with a second entity and a third entity which includes a data subdivider for subdividing a data entity into a first data portion and a second data portion. The data portions are processed by an output interface for transmitting a first message to the third entity and the second message to the second entity. In the third entity, the data portion directly received from the first entity and the other data portion received via the second entity are reassembled. This system utilizes multiple entities and if one of the entities does not respond, the transaction cannot be completed.

WO 2009/144010 discloses a server device for performing a transaction in a system having a first entity, such as a POS, a second entity, such as a user having a mobile phone with a digital camera, and a remote server. The first entity generates a code having a transaction information and sends a first message to a server. The second entity, such as a buyer of a product or a user of a service captures the code and transmits a second message to the server having information on the transaction extracted from the code. The transaction is only authorized, when the server has determined that the first message and the second message match with each other. The transaction can be a payment transfer, a grant of an access to a service or a grant of an access to an internet portal. With this system others can exploit the system and possibly capture the data during the request for information from the second entity or from the response of the second entity during transmission.

A Quick Response (QR) code is an example of a visual code comprising a matrix barcode or two-dimensional barcode representing information. A QR code has black modules or square dots which are arranged in a square grid on a white background, which can be read by an imaging device or device computer 52. Data is extracted from the patterns present in both horizontal and vertical components of the image representing the QR code. A representative QR code can be seen at 108 in FIG. 2.

It will be understood that the term "QR code" is used in the examples herein, the term is meant to encompass not just coding following the specific QR standard, but any other visual code technology which offers similar capabilities.

SUMMARY

The prior art does not provide a highly secure mechanism between two entities that is difficult for an unauthorized user to intercept and gain access to the information required to complete a transaction.

According to one embodiment of the present invention, a method of securing authentication of a user's identity is disclosed. The method comprises the steps of: an authentication program of an entity receiving initiation of a transaction from a user; the authentication program searching for associated information of the user; the authentication program choosing an authentication query requiring input from the user based on the associated information; the authentication program generating a visual code representing the authentication query; the authentication program splitting the visual code into pieces; and the authentication program sending each piece of visual code to the user via a separate communication channel.

The method can further comprise the steps of the authentication program receiving a visual code from a user containing user response to the authentication query; the authentication program reading the visual code to retrieve the user response; and the authentication program comparing the user response to the information associated with the user. If the user response matches the information associated with the user, the authentication program authenticating the user. Furthermore, the visual code sent by the user may be sent in a plurality of visual pieces through multiple communication channels, further comprise the step of the authentication program reassembling the visual code from the plurality of visual code pieces.

According to another embodiment of the present invention, a method of securing authentication of a user's identity with an entity is disclosed. The method comprising the steps of: a device computer of a user receiving a plurality of visual code pieces through different communication channels; the device computer reassembling the visual code from the plurality of visual code pieces; the device computer obtaining the authentication query from the reassembled visual code and providing the authentication query to the user for input; the device computer receiving a response from the user in response to the authentication query; the device computer generating a visual code representing the response received from the user; and the device computer sending the visual code to the entity from which the plurality of visual code pieces were received.

The visual code sent to the entity may be comprised of a plurality of visual code pieces, and the step of sending the visual code to the entity may be done through multiple communication channels.

According to another embodiment, a computer program product for securing authentication of a user's identity with a computer is disclosed. The computer is comprised of at least one processor, one or more memories, and one or more computer readable storage media. The computer program product comprising a computer readable storage medium having program instructions embodied therewith. The program instructions executable by the computer to perform a method comprising: receiving, by the computer, initiation of a transaction from a user; searching, by the computer, for associated information of the user; choosing, by the computer, an authentication query requiring input from the user based on the associated information; generating, by the computer, a visual code representing the authentication query; splitting, by the computer, the visual code into pieces;

and sending, by the computer, each piece of visual code to the user via a separate communication channel.

The computer program product can further comprise program instructions, executable by the computer to perform a method comprising the steps of the authentication program receiving a visual code from a user containing user response to the authentication query; the authentication program reading the visual code to retrieve the user response; and the authentication program comparing the user response to the information associated with the user. If the user response matches the information associated with the user, the authentication program authenticating the user. Furthermore, the visual code sent by the user may be sent in a plurality of visual pieces through multiple communication channels, further comprise the step of the authentication program reassembling the visual code from the plurality of visual code pieces.

DETAILED DESCRIPTION

Figure 1:
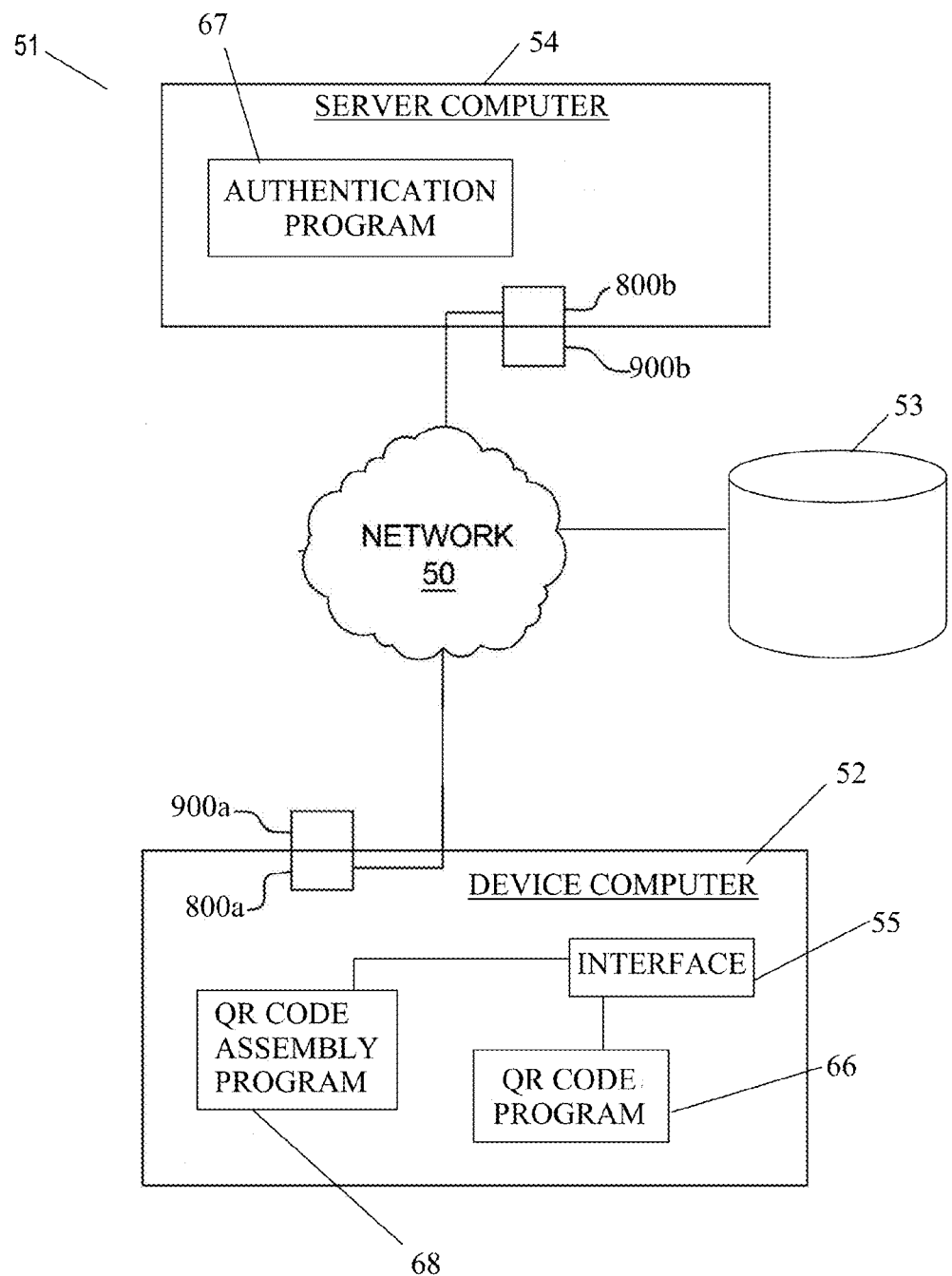
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 5:
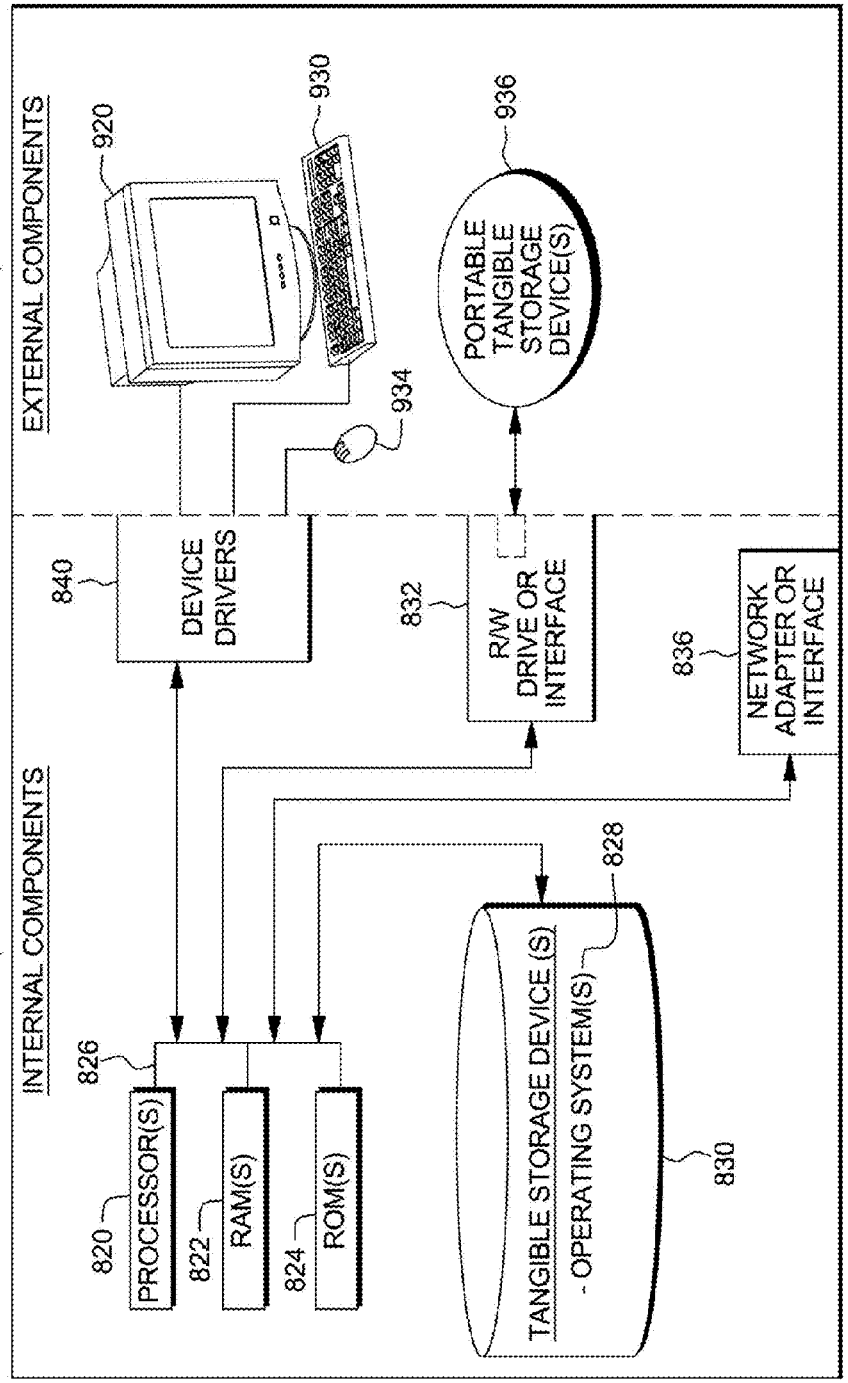
FIG. 5 illustrates internal and external components of a client or device computer and a server computer in which illustrative embodiments may be implemented.

Device computer 52 includes a set of internal components 800a and a set of external components 900a, further illustrated in FIG. 5. Device computer 52 may be, for example, a mobile device, a cell phone, a fax machine, a personal digital assistant, a netbook, a laptop computer, a tablet computer, a desktop computer, or any other type of computing device capable of sending and receiving electronic communications.

Device computer 52 may contain an interface 55. The interface 55 may accept commands and data entry from a user. The interface 55 can be, for example, a command line interface, a graphical user interface (GUI), or a web user interface (WUI). Device computer 52 may contain a camera of device of scanning and reading QR codes. The device computer 52 preferably includes a visual code (hereinafter "QR code") program 66 and a QR code assembly program 68. While not shown, it may be desirable to have the QR code program 66 and/or the QR code assembly program 68 on the server computer 54.

Repository 53 may contain questions and/or biometric values with corresponding values associated with users for authentication purposes.

Server computer 54 includes a set of internal components 800b and a set of external components 900b illustrated in FIG. 5. The server computer preferably 54 includes access to multiple communication channels to send communications to a user by any chosen data transfer protocol, such as short message service (SMS), instant messaging (IM), through the use of Hypertext Transfer Protocol (HTTP) or (HTTPS), Simple Mail Transfer Protocol (SMTP), Multimedia Messaging Service (MMS), Message Queue Telemetry Transport (MQTT), Advanced Message Queuing Protocol (AMQP), Constrained Application Protocol (CoAP), and Extensible Messaging and Presence Protocol (XMPP).

The server computer 54 preferably includes an authentication program 67. While not shown, it may be desirable to have the authentication program 67 on the device computer 52. In the depicted example, server computer 54 may provide information, such as boot files, operating system images, and applications to device computer 52. Server computer 54 can compute the information locally or extract the information from other computers on network 50.

Program code and programs such as a QR code program 66, a QR code assembly program 68, and an authentication program 67 may be stored on at least one of one or more computer-readable tangible storage devices 830 shown in FIG. 5, on at least one of one or more portable computer-readable tangible storage devices 936 as shown in FIG. 5, on repository 53 connected to network 50, or downloaded to a data processing system or other device for use. For example, program code and programs such as QR code program 66, QR code assembly program 68, and authentication program 67 may be stored on at least one of one or more tangible storage devices 830 on server computer 54 and downloaded to the device computer 52. Alternatively, server computer 54 can be a web server, and the program code and programs such as a QR code program 66, a QR code assembly program 68, and an authentication program 67 may be stored on at least one of the one or more tangible storage devices 830 on server computer 54 and accessed on the device computer 52. QR code program 66 and QR code assembly program 68 can be accessed on device computer 52 through interface 55. In other exemplary embodiments, the program code and programs such as a QR code program 66, a QR code assembly program 68, and an authentication program 67 may be stored on at least one of one or more computer-readable tangible storage devices 830 on server computer 54 or distributed between two or more servers.

Figure 2:
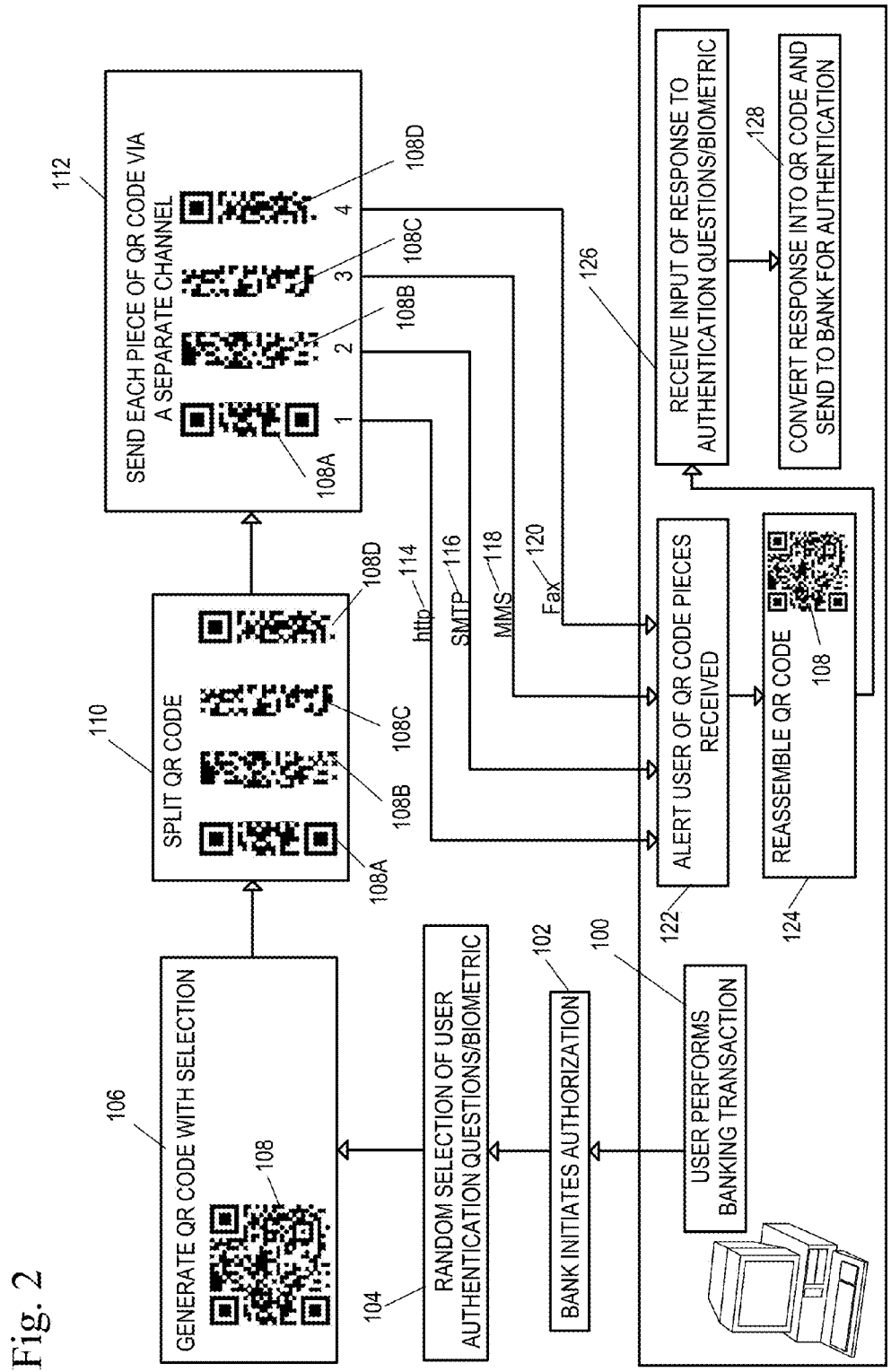
FIG. 2 shows an example of secure authentication of a user's identity through the insertion of authentication queries into a QR code which is disassembled and sent to the user through multiple communication channels for reassembly by the user.

FIG. 2 shows an example of secure authentication of a user's identity through the insertion of authentication queries into a QR code which is disassembled and sent to the user through multiple communication channels for reassembly by the user to obtain the authentication query for response.

A user initiates 100 a transaction with an entity that requires authentication of the user's identity. In this example, a user is initiating or performing an action with a banking institution, although any action or entity requiring authentication of the user's identity may perform the method.

Based on the user's login or initiation of the banking transaction, an authentication program 67 of a banking institution initiates 102 an authorization process or protocol. The authentication program 67 of the banking institution looks up the user and their associated information in, for example, repository 53, to retrieve information including authentication questions, biometrics and answers to the questions and biometrics. The lookup could be based on the login information, or on other information provided by the user or the institution or both.

Based on the information, the authentication program 67 randomly selects 104 user authentication queries which include different user authentication questions and/or biometrics associated with the user from the repository 53. The authentication questions can be any question which illicit information that aids in confirming the identity of the user, such as standardized questions with secret answers known only to the user, biographic questions relating to the user soliciting data unlikely to be known to others, or other questions. The biometrics requested may be an iris scan, facial scan, fingerprint scan or other identifying body part scan.

A QR code 108 containing the authentication query is created 106. The QR code preferably includes the actual authentication questions or biometrics requested.

The QR code 108 is then split 110 into multiple pieces. In this example shown, the QR code was split into four pieces (1-4) corresponding to 108a-108d respectively. The pieces of the QR code may be any shape or size as long as each individual piece does not contain the entire authentication query or substantially all of the authentication query. If desired, the pieces may be completely distinct as shown in the example, or they may overlap to facilitate reassembly.

Instructions on how the QR code was split or how to reassemble the code may also be sent to the device computer of the user, either along with one or more of the pieces, or by a separate channel. This would facilitate reassembly of the QR code, especially in cases where the code is split randomly or in more than one standardized fashion. For example, the system could be set up to have a number of standard patterns, and the instructions could then comprise an indication of which pattern was used. Or, the instructions could comprise some sort of data specifying the actual pattern.

Each QR code piece 108a-108d is sent to device computer of the user via a separate communication channel 112. For example the first QR code piece 108a may be sent via http 114, the second QR code piece 108b may be sent via SMPT 116, the third QR code piece 108c may be sent via MMS 118, and the fourth QR code piece may be sent via fax 120. Other communication channels may include but are not limited to https, SMTP, MQTT, SMS, MMS, AMQP, CoAP, and XMPP.

The user is notified when the QR code pieces are received 122 by the user's device computer. The notification may be visual, audio, or both. If one or more of the QR code pieces are sent by a physical medium or printed, for example if they are sent by fax or displayed on a bank's ATM machine or teller's monitor, the notification could comprise an instruction to image the printed QR code pieces using a camera or other hardware for reading of a bar code which might be on the device computer 52 of the user. If the pieces are sent fully electronically, the device computer 52 can process them internally without a need for user intervention.

The device computer 52 of the user, through a QR code assembly program 68 reassembles the QR code pieces 108a-108d to form a complete QR code 108 which then may be read and the authentication query discerned by the QR code program 66.

The reassembly could be done using instructions sent along with the pieces as noted above, or could be reassembled by one of the known photo merge programs as are commonly used by photographers to assemble multiple photographs into panoramas.

Alternatively, based on a preconfigured order of transmission via communication channels, the pieces may be reassembled. For example, a first user may be a pre-configuration in which a first piece of QR code is transmitted via HTTPS, the second piece of the QR code is transmitted via MQTT and a third piece of QR code is transmitted via SMTP. Therefore, the first user may also reassembly the QR code by instructing a program the appropriate order in which to obtain and piece together the QR code. A second user may configure their system to receive a first QR code piece via SMTP, a second QR code piece via HTTPS, and a third QR code piece via MQTT. A single user may also have multiple configurations depending on the transaction being confirmed. For example, a user may be the QR code pieces be sent via HTTPS, MQTT, and SMTP for transaction below $5000 and have QR code pieces be sent via MQTT, SMTP, and HTTPS for transactions above $10,000.

The device computer then uses the reassembled QR code to create and display the authentication query to the user.

The user inputs a response 126 through an interface of the device computer to provide a response to the authentication query.

In one embodiment, the QR code program 66 generates a QR code including the user received response and sends the QR code to the banking institution.

In another embodiment, the user's response may be sent via conventional transfer protocol. The user's response may be encrypted.

Once the banking institution receives the QR code or user's response, the authentication program 67 or a QR code program 66 scans the QR code and compares the information received from the QR code or via the transfer to the stored answers associated with the user and determines whether the answers match. If the answers match, the user is granted access to accounts of the banking institution associated with the login information. If the answers do not match, the user is denied access to accounts of the banking institution associated with the login information.

In an alternate embodiment, the QR code with the user's response to the authentication queries may also be split into pieces and set via multiple communication channels to the bank for reassembly of the QR code at the banking institution similar to the actions referred to by reference numbers 106, 110, 112, 114, 116, 118, 120, 122, and 124 of FIG. 2.

While FIG. 2 uses access to a banking institution as an example of a secure transaction which requires authentication, any type of transaction which occurs between two entities may be substituted that grants access to restricted files that may include confidential or sensitive information.

Figure 3:
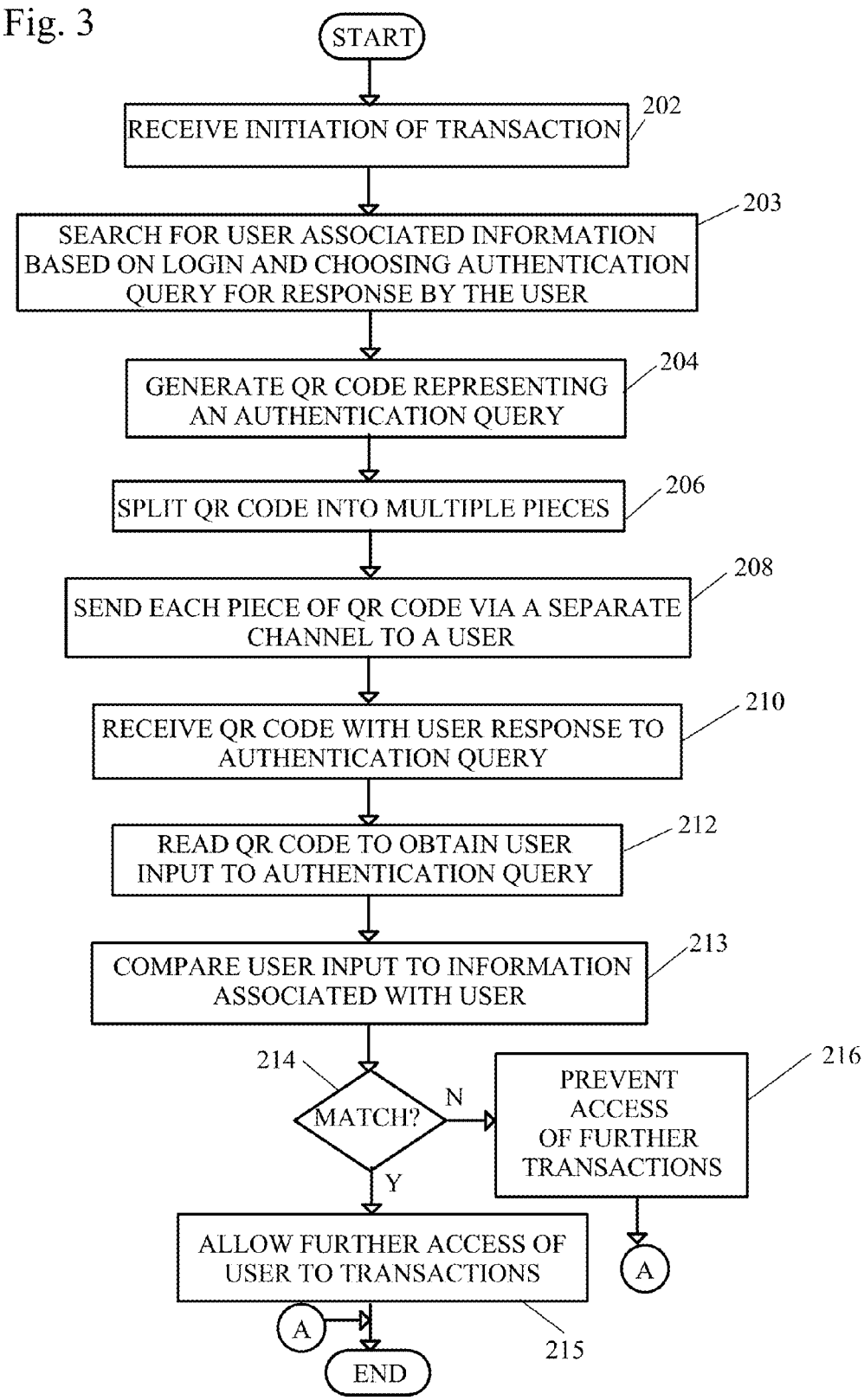
FIG. 3 shows a flow diagram of a method of dissembling a QR code containing authentication queries for the user.

FIG. 3 shows a method of generating authentication queries for user identification. In a first step, an authentication program 67 receives initiation of a transaction (step 202).

The authentication program 67 searches in a repository for the user based on the login information and chooses an authentication query for the user's input (step 203). The user information within the repository preferably includes user associated information including authentication questions, biometrics and answers to the questions and biometrics.

The authentication program 67 generates a QR code representing an authentication query (step 204). The authentication query includes different user authentication questions and/or biometrics associated with the user.

The QR code is split into multiple pieces (step 206). The pieces may be equal in size and shape or unequal. Preferably no one piece contains information to regenerate the entire authentication query. Furthermore, no one QR code piece contains substantially all of the authentication query. If desired, the pieces may be completely distinct as shown in the example, or they may overlap to facilitate reassembly.

Each QR code piece is sent to the user via a separate communication channel (step 208).

Instructions on how the QR code was split or how to reassemble the code may also be sent to the device computer of the user, either along with one or more of the pieces, or by a separate channel. This would facilitate reassembly of the QR code, especially in cases where the code is split randomly or in more than one standardized fashion. For example, the system could be set up to have a number of standard patterns, and the instructions could then comprise an indication of which pattern was used. Or, the instructions could comprise some sort of data specifying the actual pattern.

The authentication program 67 receives the user's response to the authentication query (step 210), for example in the form of at least one QR code. If the response was sent as a QR code, the authentication program 67 reads the QR code to receive the user's response to the authentication query (step 212).

The user's input is compared to the information associated with the user in the repository (step 213). If the input from the users matches (step 214) the information associated with the user in the repository, the authentication program 67 allows the continuation of the activity requiring authentication (step 215) and the method ends. If the input from the user does not match (step 214) the information associated with the user in the repository, the authentication program 67 disallows the continuation of the activity requiring authentication (step 216) and the method ends.

In an alternate embodiment, if QR code pieces are received from the user instead of a complete QR code, the additional step of reassembling the QR code pieces into a complete QR code takes place between steps 212 and 213. The QR code pieces are preferably received via different channels of communication.

Figure 4:
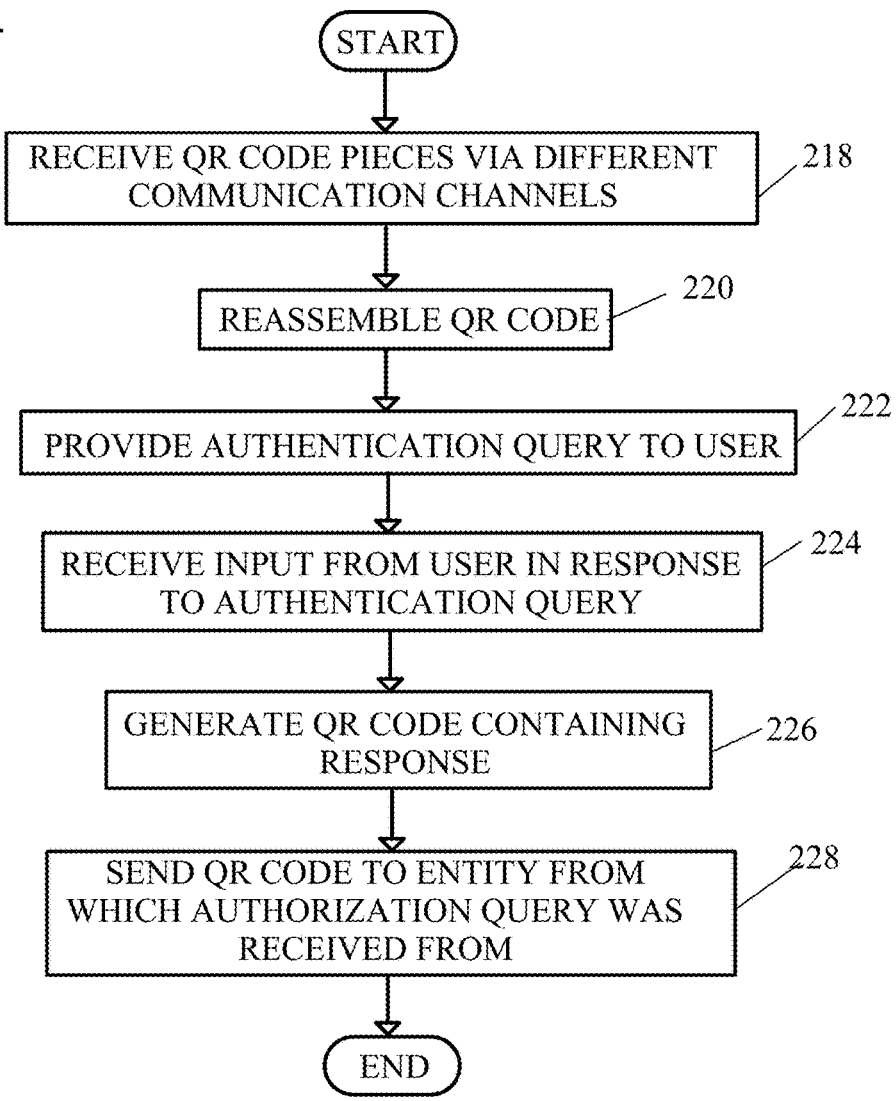
FIG. 4 shows a flow diagram of a method of providing a response to an authentication query by a device computer of a user.

FIG. 4 shows a method of providing a response to an authentication query by a device computer of a user. In a first step, a device computer receives multiple pieces of a QR code sent via separate communication channels (step 218). The QR code assembly program 68 reassembles a complete QR code from the multiple QR code pieces (step 220).

As discussed above, the reassembly could be done using instructions sent along with the pieces as noted above, or could be reassembled by one of the known photo merge programs as are commonly used by photographers to assemble multiple photographs into panoramas.

Alternatively, based on a preconfigured order of transmission via communication channels, the pieces may be reassembled. For example, a first user may be a pre-configuration in which a first piece of QR code is transmitted via HTTPS, the second piece of the QR code is transmitted via MQTT and a third piece of QR code is transmitted via SMTP. Therefore, the first user may also reassembly the QR code by instructing a program the appropriate order in which to obtain and piece together the QR code. A second user may configure their system to receive a first QR code piece via SMTP, a second QR code piece via HTTPS, and a third QR code piece via MQTT. A single user may also have multiple configurations depending on the transaction being confirmed.

The assembled QR code is read by the QR code program 66 via a device computer and the authentication query is presented to the user (step 222). The QR code program 66 receives input from a user in response to the authentication query (step 224). In one embodiment, the QR code program 66 generates a QR code representing the input from the user (step 226). The QR code is sent to the entity in which the authorization query was received from (step 228) and the method ends.

In an alternate embodiment, prior to step 228 of sending the QR code to the entity in which the authorization query was received, the QR code may be split into multiple pieces, with each of the pieces sent to the entity via different communication channels.

In a further alternate embodiment, the response is sent to the entity by the device computer via a data transfer or messaging protocol, optionally in encrypted form, rather than being encoded as a QR code.

The present invention provides the advantage of sending an authentication query and/or a user's response to the authentication query through multiple channels. Even if one were to obtain information from or exploit one of the channels, the information cannot be decoded and would be unusable without the rest of the pieces.

FIG. 5 illustrates internal and external components of device computer 52 and server computer 54 in which illustrative embodiments may be implemented. In FIG. 5, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and QR code program 66, QR code assembly program 68, and authentication program 67 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Authentication program 67, QR code assembly program 68, and QR code program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Authentication program 67, QR code assembly program 68, and QR code program 66 can be downloaded to the device computer 52 and server computer 54 from an external computer via a network (for example, the Internet, a local area network or other, wide area network) and network adapter or interface 836. From the network adapter or interface 836, authentication program 67, QR code assembly program 68, and QR code program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Authentication program 67, QR code assembly program 68, and QR code program 66 can be written in various programming languages including low-level, high-level, object-oriented or non object-oriented languages. Alternatively, the functions of an authentication program 67, QR code assembly program 68, and QR code program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A computer system for securing authentication of a user's identity comprising a computer comprising at least one processor, one or more memories, one or more computer readable storage media having program instructions executable by the computer to perform the program instructions comprising:
   receiving, by the computer, initiation of a transaction from a user;
   searching, by the computer, for associated information of the user;
   choosing, by the computer, an authentication query requiring input from the user based on the associated information;
   generating, by the computer, a visual code representing the authentication query;
   splitting, by the computer, the visual code into pieces; and
   sending, by the computer, each piece of visual code to the user via a separate communication channel.

2. The computer system of claim 1, further comprising the program instructions of:
   receiving, by the computer, a visual code from a user containing user response to the authentication query;
   reading, by the computer, the visual code to retrieve the user response; and
   comparing, by the computer, the user response to the information associated with the user;
   if the user response matches the information associated with the user, the authentication program authenticating the user.

3. The computer system of claim 2, in which the visual code sent by the user is sent in a plurality of visual pieces through multiple communication channels, further comprising the program instructions of reassembling, by the computer, the visual code from the plurality of visual code pieces.

4. The computer system of claim 1, wherein the visual code is a QR code.

5. The computer system of claim 1, wherein the authentication query comprises at least one question regarding the user.

6. The computer system of claim 1, wherein the authentication query comprises at least one request for a biometric reading of the user.

7. The computer system of claim 1, further comprising the program instructions of:
   receiving, by the computer, data from a user containing user response to the authentication query; and
   comparing, by the computer, the user response to the information associated with the user;
   if the user response matches the information associated with the user, the authenticating, by the computer, the user.

8. A computer program product for securing authentication of a user's identity with an entity comprising a device computer comprising at least one processor, one or more memories, one or more computer readable storage media, the computer program product comprising a computer readable storage medium having program instructions embodied therewith, the program instructions executable by the device computer to perform a method comprising:
   receiving, by the device computer, a plurality of visual code pieces through different communication channels;
   reassembling, by the device computer, the visual code from the plurality of visual code pieces;
   obtaining, by the device computer, the authentication query from the reassembled visual code and providing the authentication query to the user for input; and
   receiving, by the device computer, a response from the user in response to the authentication query.

9. The computer program product of claim 8, further comprising program instructions of:
   generating, by the device computer, a visual code representing the response received from the user; and
   sending, by the device computer, the visual code to the entity from which the plurality of visual code pieces were received.

10. The computer program product of claim 9, wherein the visual code sent to the entity is comprised of a plurality of visual code pieces, and the program instructions of sending, by the device computer, the visual code to the entity is done through multiple communication channels.

11. The computer program product of claim 8, wherein the different communication channels are designated in an order by the user and wherein the plurality of visual code pieces are assembled together based on the order designated by the user.

12. A computer system for securing authentication of a user's identity with an entity comprising a computer comprising at least one processor, one or more memories, one or more computer readable storage media having program instructions executable by the computer to perform the program instructions comprising:
   receiving, by the device computer, a plurality of visual code pieces through different communication channels;
   reassembling, by the device computer, the visual code from the plurality of visual code pieces;
   obtaining, by the device computer, the authentication query from the reassembled visual code and providing the authentication query to the user for input; and receiving, by the device computer, a response from the user in response to the authentication query.

13. The computer system of claim 12, further comprising program instructions of:

generating, by the device computer, a visual code representing the response received from the user; and sending, by the device computer, the visual code to the entity from which the plurality of visual code pieces were received.

14. The computer system of claim 13, wherein the visual code sent to the entity is comprised of a plurality of visual code pieces, and the program instructions of sending, by the device computer, the visual code to the entity is done through multiple communication channels.

15. The computer system of claim 12, wherein the different communication channels are designated in an order by the user and wherein the plurality of visual code pieces are assembled together based on the order designated by the user.

* * * * *